S. S. WELLS.
RESILIENT WHEEL.
APPLICATION FILED NOV. 25, 1914.

1,162,004.

Patented Nov. 30, 1915.
2 SHEETS—SHEET 1.

Attest:
Mary H. Lewis
Ada L. Barrett

Inventor:
Sheldon S. Wells
by William R. Baird
his Atty

S. S. WELLS.
RESILIENT WHEEL.
APPLICATION FILED NOV. 25, 1914.
1,162,004.
Patented Nov. 30, 1915.
2 SHEETS—SHEET 2.
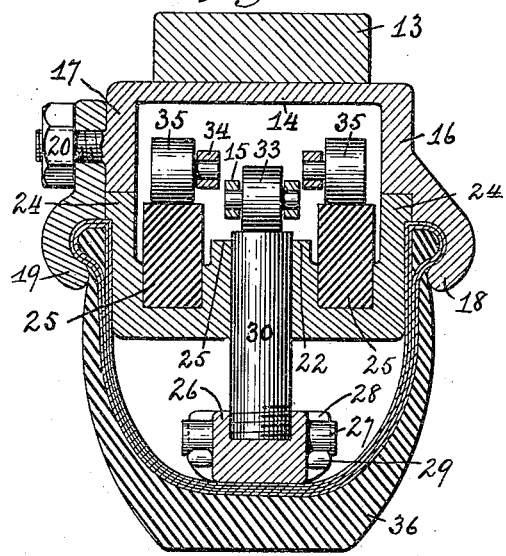
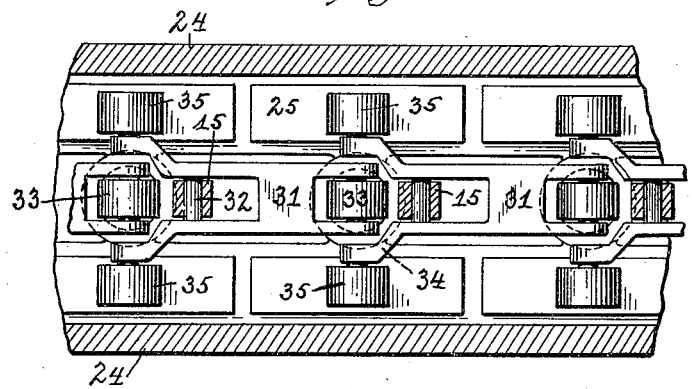
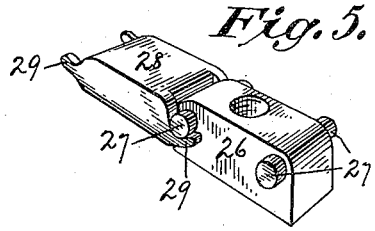
Attest:
Mary H. Lewis
Ada L. Barrett
Sheldon S. Wells, Inventor:
by William R. Baird
his Atty

UNITED STATES PATENT OFFICE.

SHELDON S. WELLS, OF SHORT HILLS, NEW JERSEY.

RESILIENT WHEEL.

1,162,004.

Specification of Letters Patent.   Patented Nov. 30, 1915.

Application filed November 25, 1914. Serial No. 873,899.

*To all whom it may concern:*

Be it known that I, SHELDON S. WELLS, a citizen of the United States, residing at Short Hills, in the county of Essex and State of New Jersey, have invented certain new and useful Improvements in Resilient Wheels, of which the following is a specification.

This invention relates to resilient wheels and its novelty consists in the construction and adaptation of the parts as will be more fully hereinafter pointed out.

Resilient wheels comprising individual yieldable elastic members in place of the annularly arranged pneumatic tire are not unknown to the art. Many of them include coiled springs which are alternately compressed and expanded under the usual conditions of traction. Such springs rapidly wear out due to the torsional strains on the metal of which they are composed. Plunger spokes, acting to compress a volume of air confined in a closed space have been frequently tried. They, however, lack rigidity and are weak and unsafe under stresses at an angle to the general plane of the wheel.

The purpose of my invention is to overcome these difficulties and disadvantages and to that end, my wheel comprises a flexible treading rim preferably equipped with a solid tire, and a series of reciprocating plungers moved radially from said rim and acting through suitable levers to compress a series of elastic blocks suitably supported for the purpose.

Figure 1:
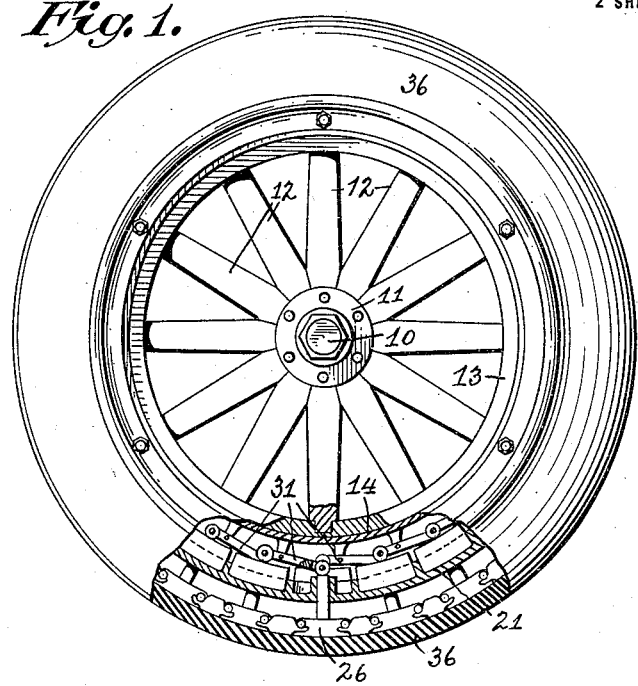
Figure 2:
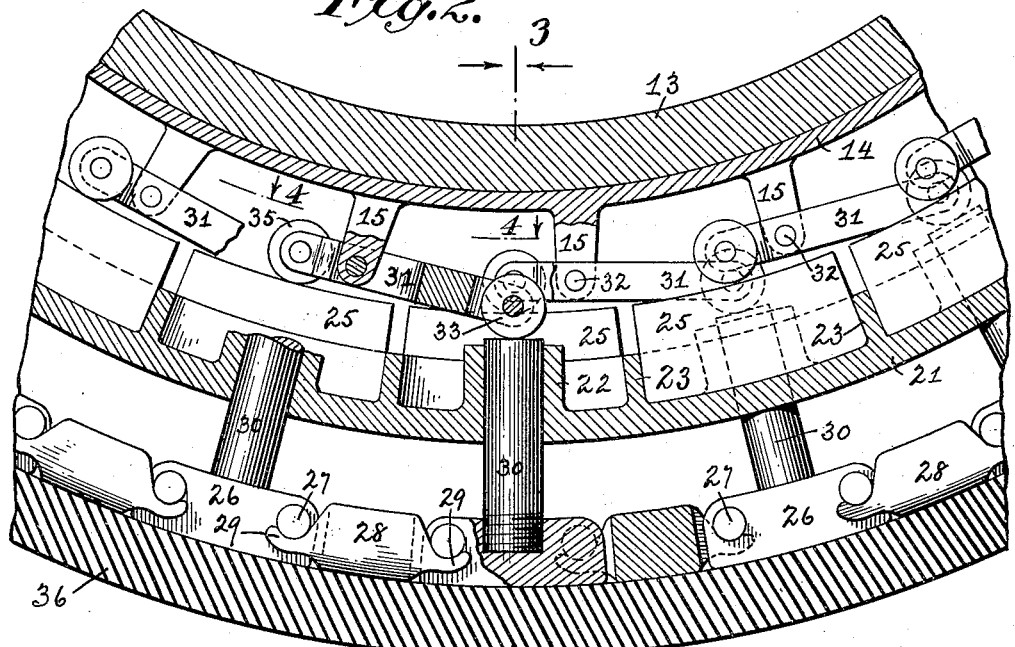

In the drawings Figure 1, is a side elevation of a preferred form of a wheel embodying my invention, some of the parts being broken away to show concealed parts. Fig. 2 is an enlarged sectional view of a portion of the wheel. Fig. 3 is a radial section on the plane of the line 3—3 in Fig. 2. Fig. 4 is a cylindrical section along the surface 4—4 in Fig 2 and showing the parts immediately beneath such surface and Fig. 5 is a perspective detail of two of the links of the flexible rim.

In the drawings 10 indicates an axle, 11 a hub, 12, 12, 12 spokes, and 13 a felly, all of usual construction. Surrounding the felly and suitably secured thereto in any convenient manner is a rim 14, of metal and provided with radial brackets 15 symmetrically arranged at intervals and also provided with inner and outer peripheral flanges 16 and 17, the former having a recessed tire receiving ring 18 secured to or made integral therewith and the latter having a recessed tire receiving ring 19 adapted to be secured thereto by nuts and bolts indicated at 20. Outside of this rim and suitably spaced therefrom is a ring 21 provided at regular intervals with inwardly projecting annular sockets 22, 22 each surrounding an aperture in the ring. Transverse radial inwardly projecting flanges 23, 23 divide the ring into a series of receiving pockets, adapted to receive rubber blocks, the pockets being arranged in two series one on each side of the series of sockets. Two annular peripheral flanges 24, 24 are secured to or made integral with the ring 21. In each pocket is secured a rubber block 25.

Beyond and outside of the ring 21 is an outer flexible rim made up of a series of socket blocks 26, each provided with projecting trunnions 27, 27 adapted to engage link blocks 28 through projections 29 provided for that purpose. Plungers 30, one to each block 26, are secured therein by a threaded connection, and adapted to project inwardly and to be reciprocated in the sockets 22 of the ring 21 provided for that purpose.

Intermediate the rim 14 and the ring 21 is a series of transmission levers 31, each adapted to swing on one of the brackets 15 by a pivot 32. Each lever carries at one end a roller 33 adapted to contact with the inner face of one of the plungers 30, and at its opposite end is provided with forks 34 on each of which is mounted a roller 35 adapted to contact with the rubber block 25 immediately beneath it. The roller 33 over a plunger is in transverse line with two rollers 35 mounted on the lever the roller on the other end of which contacts with the next plunger of the series.

A rubber tire 36 of usual form is mounted on the wheel and surrounds the outer flexible rim.

In use as the wheel revolves and one of the socket blocks 26 comes nearest to the ground, the plunger 30 is relatively moved inwardly and contacting with the roller 33 in contact with it, moves the lever 31 to which the roller is attached and swings it on its fulcrum tipping the forked end of the lever until the two rollers 35 which it carries compress the respective blocks of rubber 25 beneath them thus affording an elastic resistance to the inward push of the plunger 30, which resistance is multiplied by the leverage through which it is exerted. As the strain on the plunger is relieved the elasticity of the rubber blocks restore it at once to normal condition.

What I claim is:—

1. A resilient wheel comprising a sectional flexible rim, plungers inwardly movable therefrom and means to limit the extent of their movement comprising a solid elastic medium and an indirect connection between it and each plunger, including a lever moved by the plunger against such medium and rollers contacting with the medium and the plunger in transmitting the movement.

2. In a wheel of the kind described, a felly, a treading rim outside of the same and resilient devices between them comprising an intermediate ring, cushions carried thereon, plungers moved from the treading rim, brackets supported from the felly and levers pivoted on the brackets and moved by the plungers against the cushions.

3. In a wheel of the kind described, a felly, a treading rim outside of the same and resilient devices between them comprising an intermediate ring, a series of plungers moved from the treading rim, a series of elastic blocks carried by the intermediate ring and connections between the blocks and the plungers to compress the blocks when the plungers are moved.

4. A resilient wheel comprising a hub, spokes and felly, a rim secured to the felly and provided with a series of brackets, a ring surrounding the rim and provided with rubber blocks, and with a series of apertures between the blocks, a flexible treading rim surrounding the ring and spaced therefrom, a series of plungers secured to the treading rim and adapted to pass through the ring apertures, and levers pivoted on the brackets and contacting with the plungers and the rubber blocks.

5. In a resilient wheel the combination with a treading rim of a series of radially arranged plungers, a series of elastic compression members disposed in pairs and arranged in line therewith and a pivotal connection between each plunger and the adjacent elastic member not in line therewith.

6. In a resilient wheel the combination with a treading rim of a series of radially arranged plungers, a series of elastic members arranged in pairs, one on each side of each plunger, and a pivotal connection between each plunger and the pair of elastic members arranged on each side of the next plunger in the series.

7. In a resilient wheel the combination with a treading rim of a series of radially arranged plungers, a series of elastic members arranged in pairs one on each side of each plunger, and a pivotal connection between each plunger and the pair of elastic members arranged on each side of the next plunger in the series, such connection including a lever adapted to contact with the plunger and both members.

8. A wheel of the class described comprising a rim adjacent to the felly, a ring and a treading rim concentric therewith, a series of radial plungers secured to the treading rim and reciprocating with respect to the ring, rubber blocks secured to the ring, one alongside of each plunger and a series of levers supported from the felly rim each adapted to contact with a plunger and with the rubber block alongside of the next plunger.

9. A wheel of the class described comprising a rim adjacent to the felly, a ring and a treading rim concentric therewith, a series of radial plungers secured to the treading rim and reciprocating with respect to the ring, rubber blocks secured to the ring in pairs on two sides of each plunger and a series of forked levers pivoted to the felly rim, the straight end of each lever adapted to contact with a plunger and each of the forked ends of the same adapted to contact with the rubber blocks alongside of the next plunger.

10. A resilient wheel comprising a flexible outer rim, a linked inner rim, plungers connected thereto at the center of the links, a felly, a rim arranged on the felly, a ring secured to the last mentioned rim, provided with openings for the plungers, and pivoted means engaging resilient members associated with the plungers, the felly rim, and the ring, for limiting the movement of the outer rim.

11. A resilient wheel comprising an outer rim, plungers connected thereto, a felly, a rim supported thereon, a ring supported on said rim, said ring provided with a series of central openings arranged to receive the plungers, and a plurality of pockets arranged in pairs on either side of the plungers and adapted to receive elastic members, and means between the ends of said plungers and the elastic members for transmitting the travel of the former to elastic action of the latter.

In testimony whereof I affix my signature in presence of two witnesses.

SHELDON S. WELLS.

Witnesses:
MARY H. LEWIS,
ADA L. BARRETT.

Copies of this patent may be obtained for five cents each, by addressing the "Commissioner of Patents, Washington, D. C."